(12) United States Patent
Shevde et al.

(10) Patent No.: US 12,457,153 B1
(45) Date of Patent: Oct. 28, 2025

(54) PROVISIONING COMPUTING DEVICES

(71) Applicant: Google LLC, Mountain View, CA (US)

(72) Inventors: Sumukh A. Shevde, Encinitas, CA (US); Nazih Almalki, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/647,708

(22) Filed: Apr. 26, 2024

(51) Int. Cl.
*H04L 41/0806* (2022.01)
*H04L 41/082* (2022.01)
*H04L 41/16* (2022.01)

(52) U.S. Cl.
CPC ........ *H04L 41/0806* (2013.01); *H04L 41/082* (2013.01); *H04L 41/16* (2013.01)

(58) Field of Classification Search
CPC .... H04L 41/0806; H04L 41/082; H04L 41/16
See application file for complete search history.

(56) References Cited

U.S. PATENT DOCUMENTS

| | | | |
|---|---|---|---|
| 8,037,289 B1 * | 10/2011 | Karnik | G06F 9/44505 713/1 |
| 9,961,547 B1 | 5/2018 | Molina-Markham et al. | |
| 11,368,994 B1 * | 6/2022 | Robinson | H04W 12/08 |
| 2020/0287862 A1 | 9/2020 | Ledwith et al. | |
| 2021/0052221 A1 | 2/2021 | Panneer Selvam et al. | |
| 2021/0199811 A1 * | 7/2021 | Terry | H04W 24/02 |
| 2023/0239201 A1 * | 7/2023 | Young | H04L 41/5054 370/329 |
| 2025/0088424 A1 * | 3/2025 | Targali | H04W 12/069 |

\* cited by examiner

*Primary Examiner* — Joshua D Taylor
(74) *Attorney, Agent, or Firm* — Shumaker & Sieffert, P.A.

(57) ABSTRACT

An example manager device includes processing circuitry; and a storage device that stores instructions executable by the processing circuitry to: obtain usage data from a plurality of devices, wherein each device of the plurality of devices is associated with one or more device types of a plurality of device types, and wherein each device type of the plurality of device types specifies a usage behavior; store common information based on the usage data; store device type features for a device type based on the usage data corresponding to one or more devices of the plurality of devices associated with the device type; determine a provisioning device type for a first device; determine configuration information for provisioning the first device based on stored device type features associated with the provisioning device type and the common information; and provision the first device based on the configuration information.

20 Claims, 3 Drawing Sheets

PROVISIONING COMPUTING DEVICES

BACKGROUND

A user may operate multiple computing devices registered to a single user account. For instance, multiple wearable computing devices may be registered to a single user account, where each wearable computing device of the multiple wearable computing devices is used in a particular manner by a user associated with the user account.

SUMMARY

The techniques described herein are directed to provisioning, or otherwise pre-conditioning, a computing device based on usage data obtained from multiple computing devices registered to a single user account. For example, a manager system (e.g., a companion computing device, a cloud storage system, etc.) may obtain usage data from the multiple computing devices that specify user interactions with the multiple computing devices and/or operations executed by each computing device of the multiple computing devices. The manager system may store, based on the obtained usage data, common information specifying device configurations shared between each of the multiple computing devices, as well as device type features for each device type associated with the multiple computing devices. The manager system may store, based on the obtained usage data, device type features for a device type that specifies device configurations for the device type that is different from the common information.

The manager system may receive a request to provision or pre-condition a computing device of the multiple computing devices and/or a new computing device that has recently been registered to the user account. The manager system may determine a provisioning device type of the computing device associated with the request. The manager system may determine, based on stored device type features associated with the determined provisioning device type and the common information, configuration information for provisioning or pre-conditioning the computing device associated with the request. For example, the manager system may determine configuration information such as a schedule of operations to be executed by the computing device associated with the request, software application that may be installed and executed by the computing device associated with the request, device settings (e.g., display settings, notification settings, etc.), or the like. The manager system may provision or pre-condition the computing device associated with the request based on the determined configuration information. For example, the manager system may configure, provision, or otherwise pre-condition the computing device associated with the request by sending the computing device instructions to implement configuration information determined based at least on combining common information associated with all device types and device type features associated with the determined provisioning device type.

In one example, this disclosure describes a method includes obtaining, by one or more processors executing at a manager system, usage data from a plurality of devices, wherein each device of the plurality of devices is associated with one or more device types of a plurality of device types, and wherein each device type of the plurality of device types specifies a usage behavior; storing, by the one or more processors, common information based on the usage data, the common information specifying device configurations shared between each of the plurality of devices; for each device type of the plurality of device types: storing, by the one or more processor, device type features for a device type based on the usage data corresponding to one or more devices of the plurality of devices associated with the device type, the device type features specifying device configurations for the device type that is different than the common information; determining, by the one or more processors, a provisioning device type for a first device not included in the plurality of devices, the provisioning device type specifying at least one device type of the plurality of device types; determining, by the one or more processors, configuration information for provisioning the first device based on stored device type features associated with the provisioning device type and the common information; and provisioning, by the one or more processors, the first device based on the configuration information.

In another example, this disclosure describes a manager device includes at least one processor; and a storage device that stores instructions executable by the at least one processor to: obtain usage data from a plurality of devices, wherein each device of the plurality of devices is associated with one or more device types of a plurality of device types, and wherein each device type of the plurality of device types specifies a usage behavior; store common information based on the usage data, the common information specifying device configurations shared between each of the plurality of devices; for each device type of the plurality of device types: storing device type features for a device type based on the usage data corresponding to one or more devices of the plurality of devices associated with the device type, the device type features specifying device configurations for the device type that is different than the common information; determine a provisioning device type for a first device not included in the plurality of devices, the provisioning device type specifying at least one device type of the plurality of device types; determine configuration information for provisioning the first device based on stored device type features associated with the provisioning device type and the common information; and provision the first device based on the configuration information.

In another example, this disclosure describes computer-readable storage medium encoded with instructions that, when executed, cause at least one processor of a computing system to: obtain usage data from a plurality of devices, wherein each device of the plurality of devices is associated with one or more device types of a plurality of device types, and wherein each device type of the plurality of device types specifies a usage behavior; store common information based on the usage data, the common information specifying device configurations shared between each of the plurality of devices; for each device type of the plurality of device types: store device type features for a device type based on the usage data corresponding to one or more devices of the plurality of devices associated with the device type, the device type features specifying device configurations for the device type that is different than the common information; determine a provision device type for a first device not included in the plurality of devices, the provision device type specifying at least one device type of the plurality of device types; determine configuration information for provision the first device based on stored device type features associated with the provision device type and the common information; and provision the first device based on the configuration information.

The details of one or more examples of the disclosure are set forth in the accompanying drawings and the description below. Other features, objects, and advantages will be apparent from the description and drawings, and from the claims.

DETAILED DESCRIPTION

Figure 1:
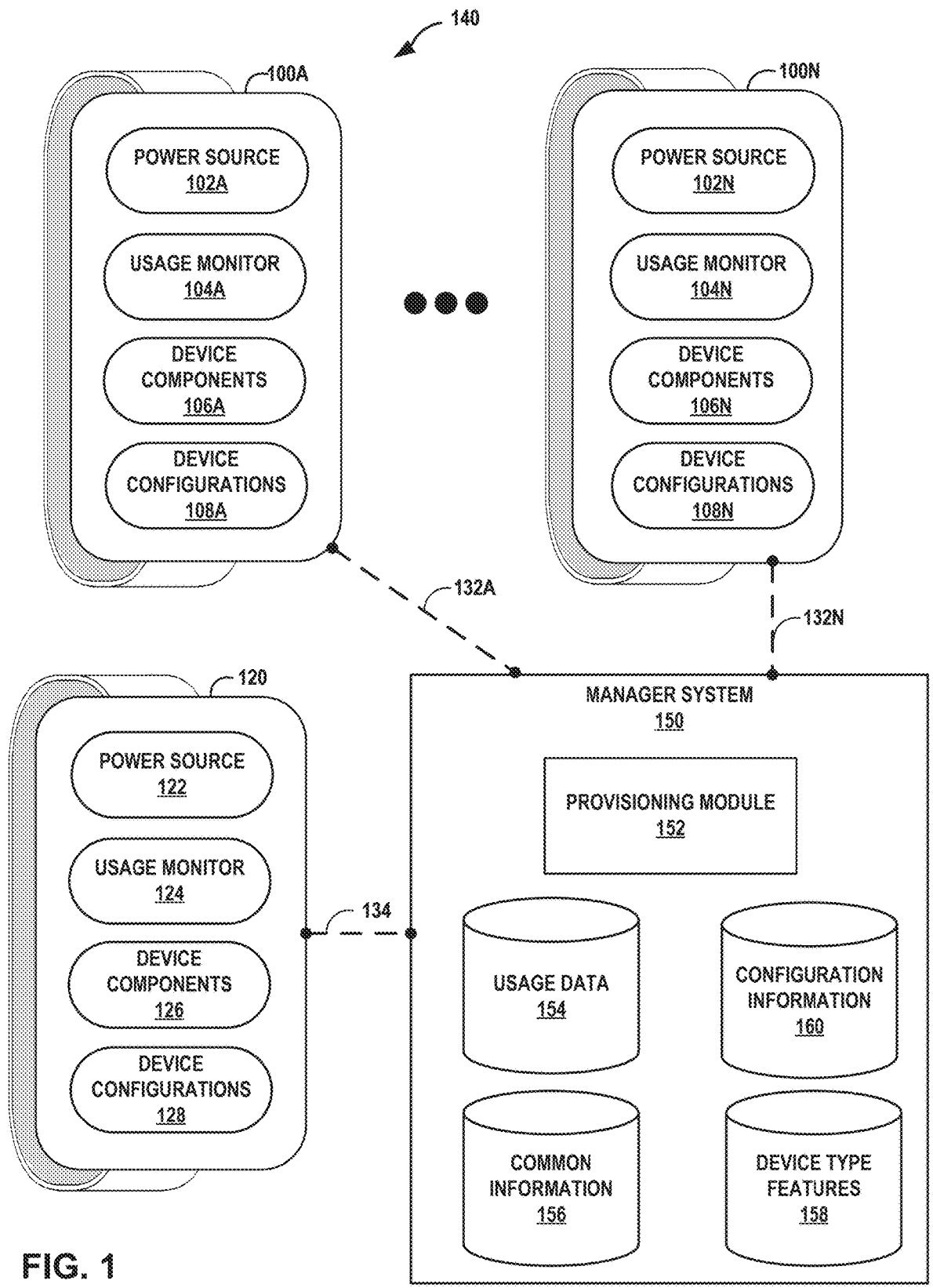
FIG. 1 is a conceptual diagram illustrating an example computing environment for provisioning computing devices, in accordance with one or more aspects of the present disclosure.

FIG. 1 is a conceptual diagram illustrating example computing environment 140 for provisioning computing devices 100 and/or 120, in accordance with one or more aspects of the present disclosure. Computing environment 140, in the example of FIG. 1, may include manager system 150, computing devices 100A-100N (collectively referred to herein as, "computing devices 100), and computing device 120.

Manager system 150 may include, but is not limited to, portable, mobile, or other devices, such as mobile phones (including smartphones), wearable computing devices (e.g., smart watches, smart glasses, etc.), laptop computers, desktop computers, tablet computers, smart speakers, smart television platforms, server computers, mainframes, infotainment systems, or the like. For example, manager system 150 may include a companion device (e.g., a smartphone) for computing devices 100 and/or computing device 120 that may include functionality for configuring, monitoring, or otherwise controlling any of computing devices 100 and/or computing device 120. Manager system 150 may include functionality to control any of computing devices 100 and/or computing device 120 based on explicit user consent that may be provided via login credentials associated with a user operating manager system 150, computing devices 100, and/or computing device 120, for example. In some instances, manager system 150 may include, but is not limited to, remote computing systems, such as one or more desktop computers, laptop computers, mainframes, servers, cloud computing system, etc. capable of sending information to and receiving information from computing devices 100 and/or computing device 120. Manager system 150 may be communicatively coupled to any of computing devices 100 via connections 132A-132N (collectively referred to herein as, "connections 132"), as well as communicatively coupled to computing device 120 via connection 134. Connections 132, 134 may include near-field communication (NFC), Bluetooth® or different profiles thereof (e.g., Bluetooth® low energy (BLE)), WIFI Direct, a wired connection (e.g., Ethernet, Universal Serial Bus (USB) or different profiles thereof, e.g., USB-C, etc.).

Computing devices 100 and/or computing device 120 may include a mobile computing device, such as a mobile phone (including a smartphone), a laptop computer, a tablet computer, a wearable computing device, or any other computing device that may be communicatively coupled to manager system 150. In some examples, computing devices 100 and/or computing device 120 may include a wearable computing device such as a computerized watch, a computerized fitness band/tracker, computerized eyewear, computerized headwear, a computerized glove, or any other type of mobile computing device that can attach to or be worn on a person's body or clothing.

In the example of FIG. 1, computing devices 100 may include corresponding power sources 102A-102N (collectively referred to herein as "power sources 102"), corresponding usage monitors 104A-104N (collectively referred to herein as "usage monitors 104"), corresponding device components 106A-106N (collectively referred to herein as "device components 106"), and device configurations 108A-108N (collectively referred to herein as "device configurations 108"). Similarly, computing device 102 may include power source 122, usage monitor 124, device components 126, and device configurations 128.

Device components 106, 126 may include processors, memory, sensors, communication units, etc. that support operations of computing devices 100 and computing device 120, respectively. For example, device components 106, 126 may include processors that implement functionality and/or execute instructions within computing devices 100 and computing device 120, respectively. Device components 106, 126 may include storage devices that may store information for processing during operation of computing devices 100 and computing device 120 (e.g., device components 106, 126 may store data accessed by usage monitors 104, 124 and/or device configurations 108, 128). Device components 106, 126 may include sensors that generate data based on environmental factors, such as a heart rate sensor, an oximetry sensor, an ambient light sensor, an accelerometer, a gyroscope, a microphone, a barometric pressure sensor, an ambient temperature sensor, a magnetometer, a skin conductance sensor, a skin temperature sensor, a global positioning system (GPS), or the like. Device components 106, 126 may include communication units such as a network interface card (e.g., Ethernet card), an optical transceiver, a radio frequency transceiver, a GNSS receiver, or any other type of communication unit that can send and/or receive information.

Power sources 102, 122 may provide power to one or more components (e.g., device components 106, 126) of respective computing devices. In some examples, power sources 102, 122 may be a battery. Power sources 102, 122 may provide power to usage monitors 104, 124, device components 106, 126, and device configurations 108, 128, respectively. Examples of power sources 102, 122 may include, but are not necessarily limited to, batteries having zinc-carbon, lead-acid, nickel cadmium (NiCd), nickel metal hydride (NiMH), lithium ion (Li-ion), and/or lithium polymer (Lipo) chemistries.

Device configurations 108, 128 may include configuration information for software (e.g., software applications, operating systems, etc.) executing at computing devices 100 and computing device 120, respectively. For example, device configurations 108, 128 may include configuration information representing software application data, user preferences (e.g., display settings), or the like. Device configurations 108, 128 may include computer-readable software for implementing configuration information via device components 106, 126. For example, device configurations 108A may implement configuration information corresponding to a display always-on setting by generating and outputting corresponding instructions to a display device of device components 106A.

Usage monitors 104, 124 may include software modules configured to monitor and collect usage information data of the respective computing devices. For example, usage monitor 104A of computing device 100A may obtain, responsive to receiving explicit user consent, usage data that include user interactions with computing device 100A (e.g., a user opening a software application at a particular point in a day) and/or operations executed computing device 100A (e.g., computing device 100A outputs music via a software application at a particular point in a day). Usage monitors 104, 124 may continuously send usage data to manager system 150, via connections 132, 134. In some examples, usage monitors 104, 124 may periodically send usage data to manager system 150 responsive to determining an event (e.g., a respective computing device is charging power sources 102, 122).

Computing devices 100 may each correspond to a device type of a plurality of device types. Computing devices 100 may correspond to device types that include labels or identifiers associated with particular usage patterns of corresponding computing devices 100. For example, computing device 100A may correspond to a device type including a label of "daily watch," computing device 100B may correspond to a device type including a label of "training watch," computing device 100N may correspond to a device type including a label of "special event watch," and so on.

Computing devices 100 with different device types may unnecessarily consume power of power sources 102 by executing operations of device components 126 that do not correspond to usage patterns associated with device types of computing devices 100. For example, in instances where computing device 100N may correspond to a device type of "special event watch," device configurations 108N may include configurations for an always on display based on default settings associated with computing devices 100. During operation of computing device 100N, a user operating computing device 100N may not use the always on display, thereby unnecessarily consuming power of power source 102N.

Manager system 150, according to the techniques described herein, may determine, based on usage data representing usage behavior of computing devices 100, device features of various device types that may be used to intelligently schedule operations of computing devices 100 and conserve power of power sources 102.

In addition, manager system 150 may automatically provision, or otherwise pre-condition, computing device 120. In the example of FIG. 1, computing device 120 may be a computing device that a user operating computing devices 100 wants to provision based on a device type of computing device 120. Conventionally, computing device 120 may be provisioned based on snapshots of any of computing devices 100. However, provisioning computing device 120 based on snapshots may consume a significant amount of power of power source 122, as well as provision computing device 120 with configuration information that may be unnecessary for a device type associated with computing device 120. For example, in instances where computing device 120 is associated with a "training watch" device type, computing device 120 may be provisioned based on a snapshot that include configurations of application data for applications (e.g., messaging applications) that a user operating computing device 120 may not use when operating computing device 120, thereby unnecessarily consuming power of power source 122 during operation of computing device 120. Manager system 150, according to the techniques described herein, may intelligently provision computing device 120 by determining a provisioning device type of computing device 120 and provisioning computing device 120 with configuration information associated with the determined provisioning device type.

In accordance with the techniques described herein, manager system 150 may provision, or otherwise pre-condition, computing device 120 according to a determined provisioning device type of computing device 120. Manager system 150 may receive a request to provision computing device 120 based on an input from a user operating computing devices 100 indicating the user wants to add computing device 120 to an account associated with the user. In some examples, manager system 150 may receive a request to provision computing device 120 that specifies a device type associated with computing device 120. Manager system 150 may determine configuration information for provisioning, or otherwise pre-conditioning, computing device 120 associated with the provisioning device type of computing device 120 based on usage data obtained from computing devices 100. Provisioning module 152 of manager system 150 may obtain usage data that may include user interactions with computing devices 100 and/or operations executed by computing devices 100. Usage monitors 104 may monitor and collect usage data for computing devices 100. Usage monitors 104 may send the usage data associated with computing devices 100 to provisioning module 152 via connections 132, for example. Provisioning module 152 may store the obtained usage data as usage data 154.

In situations in which the systems (e.g., manager system 150) discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Provisioning module 152 may store, based on usage data 154, common information associated with computing devices 100 as common information 156. Provisioning module 152 may apply a machine learning model to ascertain common information of common information 156 from the usage data of usage data 154 as device configurations or device features shared between each computing device of computing devices 100. For example, provisioning module 152 may store common information as common information 156 that include device configurations such as continuous operation of particular sensors (e.g., heart-rate sensor, step counting sensor, etc.) and/or installation of software applications (e.g., messaging applications, location based services, etc.) that are utilized by each computing device of computing devices 100.

Provisioning module 152 may store, based on usage data 154, device type features for each device type associated with computing devices 100 as device type features 158. Provisioning module 152 may apply a machine learning model to ascertain device type features of device type features 158 from the usage data of usage data 154 as device configurations or device features particular to various device types associated with computing devices 100 that were not included in common information 156. For example, provisioning module 152 may provide the machine learning model usage data 154 and common information 156. The machine learning model of provisioning module 152 may output device type features 158 based on usage data 154 and common information 156. Provisioning module 152 may store device type features as device type features 158 that includes a first set of device configurations (e.g., sensor operations, software applications, etc.) particular to a first device type (e.g., a "daily watch" device type), a second set of device configurations particular to a second device type (e.g., a "training watch" device type), a third set of device configurations particular to a third device type (e.g., "special event watch" device type), and so on. Provisioning module 152 may store device type features as a mapping of device specific configurations to corresponding device types.

Provisioning module 152 may determine a provisioning device type for computing device 120. Provisioning module 152 may determine a provisioning device type for computing device 120 that specifies at least one device type of the device types associated with computing devices 100. In some instances, provisioning module 152 may determine a provisioning device type based on usage data collected by usage monitor 124. Provisioning module 152 may obtain usage data from usage monitor 124 specifying user interaction with and/or operations executed by computing device 120. Provisioning module 152 may determine the provisioning device type associated with computing device 120 by comparing the usage data collected by usage monitor 124 to usage data associated with computing devices 100 stored in usage data 154. For example, provisioning module 152 may determine the provisioning device type associated with computing device 120 is a "special event watch" device type based on usage data obtained from usage monitor 124 being similar to usage data associated with computing device 100N which is labeled with a "special event watch" device type. In some examples, provisioning module 152 may obtain an indication from a user associated with computing devices 100 of the provisioning device type of computing device 120. For example, provisioning module 152 may obtain the request to provision computing device 120 that includes the indication of the provisioning device type of computing device 120.

Provisioning module 152 may determine configuration information of configuration information 160 for provisioning computing device 120 based on device type features of devices type features 158 associated with the determined provisioning device type and the common information of common information 156. Provisioning module 152 may determine the configuration for provisioning computing device 120 as device configurations including device type features associated with the provisioning device type and the common information. Provisioning module 152 may determine the configuration information by combining device configurations specific by common information 156 with device configurations specified by device type features of device type features 158 associated with the determined provisioning device type. Provisioning module 152 may determine the configuration information as device components and/or software applications that will likely be used when a user operates computing device 120 based on the determined provisioning device type. For example, provisioning module 152 may determine configuration information for the determined provisioning device type that includes habits, patterns, or behaviors of a user operating a computing device corresponding to the provisioning device type, such as a time of day a user operating the computing device performs an activity (e.g., driving to or from work, listening to music with a music application, receiving a high volume of notifications, etc.).

Provisioning module 152 may provision, or otherwise pre-condition, computing device 120 based on configuration information of configuration information 160 corresponding to the determined provisioning device type. Provisioning module 152 may send the configuration information specific to the determined provisioning device type to computing device 120 via connection 134, for example. Computing device 120 may store the configuration information as device configurations 128. Computing device 120 may implement device configurations 128 to adapt operations of computing device 120 (e.g., operations of device components 126) to habits, patterns, or behaviors of a user operating a device type corresponding to computing device 120. For example, computing device 120 may implement the configuration information of device configurations 128 to install particular software applications, refrain from installing software applications that may be installed at any of computing devices 100 associated with a different device type than computing device 120, initiate particular sensors, refrain from providing power to sensors, or the like. In this way, manager system 150 may provision computing device 120 with configuration information that avoids computing device 120 unnecessarily consuming power of power source 122.

In some instances, provisioning module 152 may provision computing device 120 by generating a schedule of operations based on the configuration information associated with the determined provisioning device type. Provisioning module 152 may generate a schedule that includes an allocation of computational resources associated with a set of operations that may be executed by a computing device (e.g., any of computing devices 100 or computing device 120). Provisioning module 152 may generate the schedule based on the configuration information associated with the provisioning device type by providing a machine learning model (e.g., a neural network) with the configuration information. Provisioning module 152 may apply the machine learning model to identify computational resources (e.g., device components 126 and/or device configurations 128) of a computing device (e.g., computing device 120) that are often used by a user operating the computing device, and to identify when (e.g., a time of day, day of the week, etc.) the computational resources are utilized by a user operating the computing device. Provisioning module 152 may output or send the schedule of operations to computing device 120. Computing device 120 may store the schedule as device configurations 128. Computing device 120 may access the schedule included in device configurations 128 to intelligently execute, or otherwise allocate, computational resources of computing device 120 (e.g., device components 126) according to the schedule.

In some instances, provisioning module 152 may continuously or periodically obtain usage data from computing devices 100 and computing device 120. Provisioning module 152 may update common information stored at common information 156 based on new usage data (e.g., new usage data obtained from computing device 120). For example, provisioning module 152 may update common information 156 based on device configurations shared between each of computing devices 100 and computing device 120. Provisioning module 152 may additionally, or alternatively, update device type features 158 based on any newly obtained usage data and/or updated common information of common information 156. Provisioning module 152 may determine new configuration information of configuration information 160 based on any updated device type features of device type features 158. Provisioning module 152 may then send the new configuration information to corresponding computing devices such that device configurations 108, 128 of the respective computing devices adapt to any change in habit, pattern, or behavior of a user operating computing devices 100, 120.

In some instances, provisioning module 152 may determine a new device type for computing device 120. Provisioning module 152 may determine the new device type associated with computing device 120 based on usage data associated with computing device 120 that may be obtained via usage monitor 124, for example. Provisioning module 152 may update common information 156, based on the usage data associated with computing device 120, to specify device configurations shared between each of computing devices 100 and computing device 120. Provisioning module 152 may store, based on the usage data associated with computing device 120, device type features specifying device configurations specific to the new device type in device type features 158.

The techniques may provide one or more technical advantages that realize one or more practical applications. For example, manager system 150 may learn user habits, patterns, or behavior of a user operating computing devices 100 having various device types by ascertaining common information and device type features based on usage data obtained from computing device 100. Manager system 150 may determine configuration information for pre-conditioning or provisioning a new computing device (e.g., computing device 120), as well as for periodically pre-conditioning or provisioning any of computing devices 100 by continuing to obtain usage data from computing devices 100 and updating device type features 158 and common information 156. In this way, manager system 150 may intelligently configure computing devices to conserve power of power sources of the computing devices based on learned user habits, patterns, or behavior.

Figure 2:
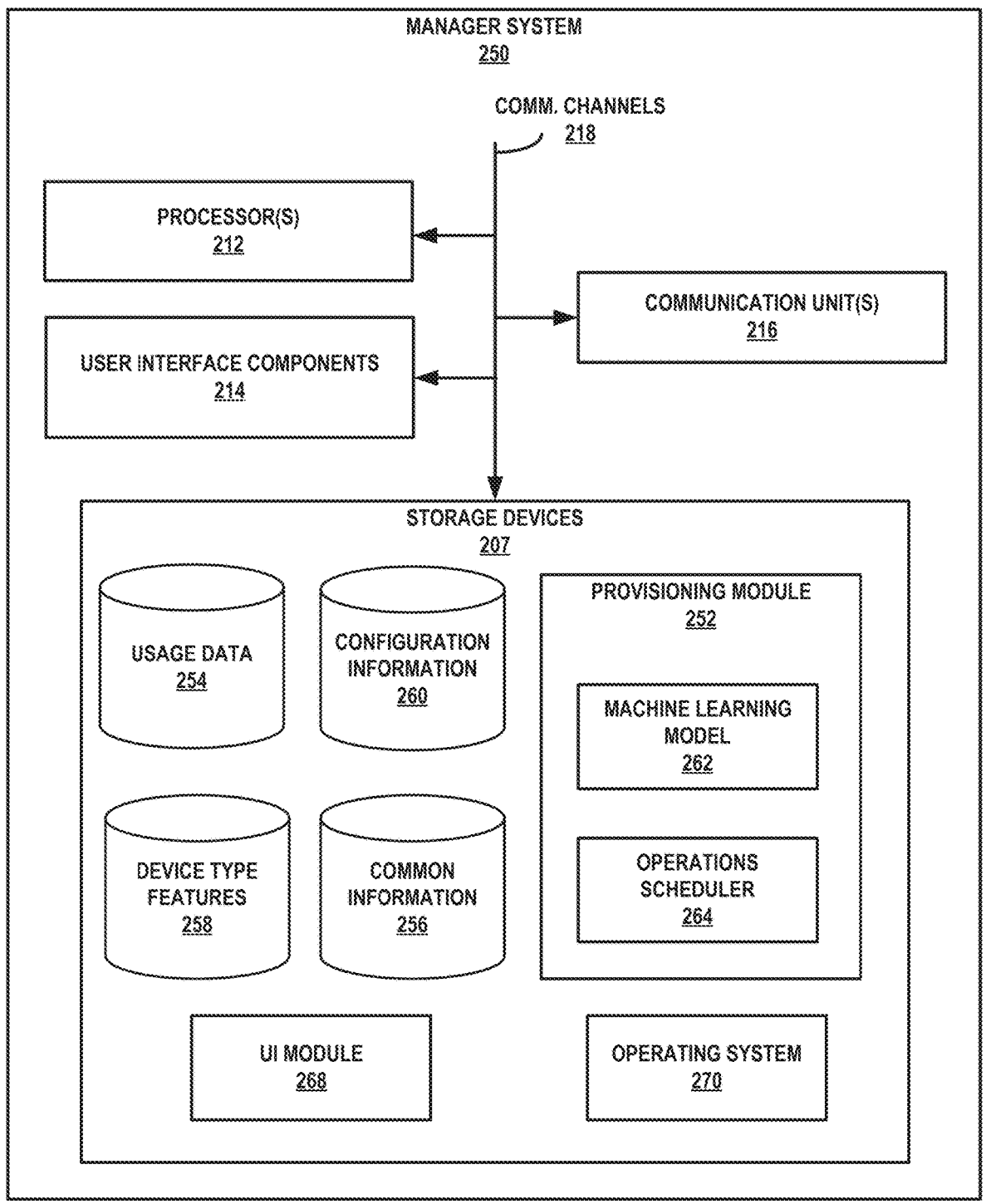
FIG. 2 is a block diagram illustrating an example manager system for provisioning a computing device, in accordance with one or more aspects of the present disclosure.

FIG. 2 is a block diagram illustrating an example manager system for provisioning a computing device, in accordance with one or more aspects of the present disclosure. Manager system 250, provisioning module 252, usage data 254, common information 256, device type features 258, and configuration information 260 of FIG. 2 may be example or alternative implementations of manager system 150, provisioning module 152, usage data 154, common information 156, device type features 158, and configuration information 160 of FIG. 1, respectively.

In the example of FIG. 2, manager system 250 may include processors 212, user interface (UI) components 214, communication units 216, storage devices 207, and communication channels 218 that may interconnect each of components 212, 214, 216, and 207 for inter-component communications (physically, communicatively, and/or operatively). In some examples, communication channel 218 may include a system bus, a network connection, an inter-process communication data structure, or any other method for communicating data.

Communication units 216 may communicate with one or more external devices via one or more wired and/or wireless networks by transmitting and/or receiving network signals on the one or more networks. Examples of communication units 216 may include a network interface card (e.g., such as an Ethernet card), an optical transceiver, a radio frequency transceiver, a GNSS receiver, or any other type of device that can send and/or receive information. Other examples of communication units 216 may include short wave radios, cellular data radios (for terrestrial and/or satellite cellular networks), wireless network radios, as well as universal serial bus (USB) controllers.

UI components 214 may include a display and/or input/output (I/O) devices. For example, UI components 214 may include a presence-sensitive display configured to detect input (e.g., touch and non-touch input) from a user operating manager system 250. UI components 214 may output information to a user in the form of a UI, which may be associated with functionality provided by manager system 250. Such UIs may be associated with computing platforms, operating systems, applications, and/or services executing at or accessible from manager system 250 (e.g., electronic message applications, chat applications, Internet browser applications, mobile or desktop operating systems, social media applications, electronic games, menus, and other types of applications).

UI components 214 may receive input, such as tactile, audio, and/or video input. UI components 214, in some examples, include a presence-sensitive display, a fingerprint sensor, touch-sensitive screen, mouse, keyboard, voice responsive system, video camera, microphone or any other type of device for detecting input from a human or machine. UI components 214 may include one or more sensors. Numerous examples of sensors exist and include any input component configured to obtain environmental information about the circumstances surrounding manager system 250 and/or physiological information that defines the activity state and/or physical well-being of a user of manager system 250. In some examples, a sensor may be an input component that obtains physical position, movement, and/or location information of manager system 250. For instance, sensors may include one or more location sensors (e.g., GNSS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

UI components 214 may generate one or more outputs. Examples of outputs are tactile, audio, and video output. UI components 214, in one example, includes a presence-sensitive display, sound card, video graphics adapter card, speaker, liquid crystal display (LCD), or any other type of device for generating output to a human or machine.

Processors 212 may implement functionality and/or execute instructions within manager system 250. For example, processors 212 may receive and execute instructions that provide the functionality of provisioning module 252, UI module 268, and OS 270. These instructions executed by processors 212 may cause manager system 250 to store and/or modify information within storage devices 207 or processors 212 during program execution. Processors 212 may execute instructions of provisioning module 252, UI module 268, and OS 270 to perform one or more operations. That is provisioning module 252, UI module 268, and OS 270 may be operable by processors 212 to perform various functions described herein.

Storage devices 207, in the example of FIG. 2, may include provisioning module 252, usage data 254, common information 256, device type features 258, configuration information 260, user interface (UI) module 268, and operating system (OS) 270. Storage devices 207 may store information for processing during operation of manager system 250 (e.g., manager system 250 may store data accessed by provisioning module 252, UI module 268, and OS 270 during execution at manager system 250). In some examples, storage devices 207 may include temporary memory, meaning that a primary purpose of storage devices 207 is not long-term storage. Storage devices 207 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 207 may include one or more computer-readable storage media.

Storage devices 207 may be configured to store larger amounts of information than volatile memory. Storage devices 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 207 may store program instructions and/or information associated with provisioning module 252, UI module 268, and OS 270.

UI module 268 may perform operations described herein using hardware, software, firmware, or a mixture thereof residing in and/or executing at manager system 250. Manager system 250 may execute UI module 268 with processors 212. In some examples, manager system 250 may execute UI module 268 as a virtual machine executing on underlying hardware. UI module 268 may execute as one or more services of an operating system or computing platform or may execute as one or more executable programs at an application layer of a computing platform. UI module 268 may be operable by manager system 250 to perform one or more functions, such as receive input and send indications of such input to other components associated with manager system 250. UI module 268 may also receive data from components associated with manager system 250. Using the data received, UI module 268 may cause other components associated with manager system 250 to provide output based on the data.

OS 270 may control the operation of components of manager system 250. For example, OS 270 may facilitate the communication of provisioning module 252, UI module 268, and OS 270 with processors 212, storage devices 207, and communication units 216. In some examples, OS 270 may manage interactions between software applications and a user operating manager system 250. OS 270 may have a kernel that facilitates interactions with underlying hardware of manager system 250 and provides a fully formed application space capable of executing a wide variety of software applications having secure partitions in which each of the software applications executes to perform various operations. In some examples, UI module 268 may be considered a component of OS 270.

In accordance with the techniques described herein, provisioning module 252 may determine, store, and/or output configuration information for provisioning, or otherwise pre-conditioning, a computing device according to a provisioning device type of the computing device. As shown in the example of FIG. 2, provisioning module 252 may include machine learning model 262 and operations scheduler 264. Machine learning model 262 may include one or more machine learning models (e.g., a neural network, a language model, reinforcement learning, linear regression, etc.) configured to detect habits, patterns, or behaviors of a user operating a computing device based on usage data obtained from the computing device. For example, machine learning model 262 may include a machine learning model that implements learning algorithms to output common information 256 that includes device configurations shared between different computing devices, regardless of device types associated with the different computing devices. Machine learning model 262 may include a machine learning model that implements learning algorithms to output device type features 258 that include particular device configurations for various device types that are not included in common information 256.

Provisioning module 252 may apply the outputs of machine learning model 262 to generate configuration information 260. Provisioning module 252 may generate configuration information 260 for various device types based on device type features 258 and common information 256. For example, provisioning module 252 may generate first configuration information of configuration information 260 for a first device type, second configuration information of configuration information 260 for a second device type, third configuration information of configuration information 260 for a third device type, and so on. Provisioning module 252 may provision a computing device by providing the computing device configuration information of configuration information 260 corresponding to the device type associated with the computing device.

Operations scheduler 264 of provisioning module 252 may generate a schedule of operations for a computing device based on a device type associated with the computing device. For example, operations scheduler 264 may generate a schedule for a set of operations such that a computing device that implements the schedule experiences a more uniform discharge. Provisioning module 252 may provide the schedule generated by operations scheduler 264 to allocate computational resources of a computing device based on a learned behavior associated with a device type that is learned over time.

Figure 3:
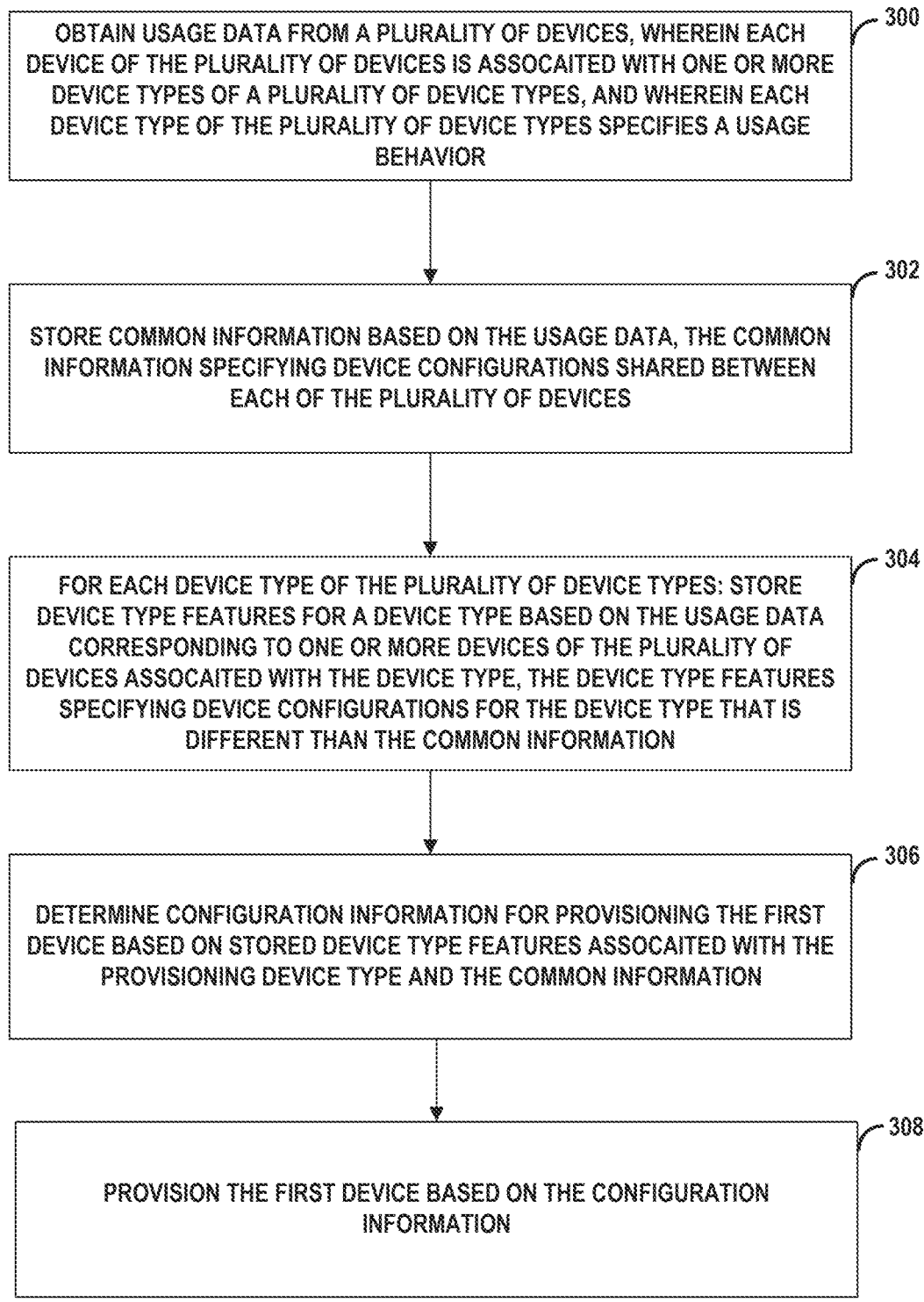
FIG. 3 is a flowchart illustrating an example process for provisioning a computing device, in accordance with one or more aspects of the present disclosure.

FIG. 3 is a flowchart illustrating an example process for provisioning a computing device, in accordance with one or more aspects of the present disclosure. FIG. 3 may be discussed with respect to FIGS. 1 and 2 for example purposes only.

As seen in the example of FIG. 3, manager system 150 may obtain usage data from a plurality of devices, wherein each device of the plurality of devices is associated with one or more device types of a plurality of device types, and wherein each device type of the plurality of device types specifies a usage behavior (300). Manager system 150 may store common information based on the usage data, the common information specifying device configurations shared between each of the plurality of devices (302). Manager system 150 may determine a provisioning device type for a first device not included in the plurality of devices, the provisioning device type specifying at least one device type of the plurality of device types (304). Manager system 150 may determine configuration information for provisioning the first device based on stored device type features associated with the provisioning device type and the common information (306). Manager system 150 may provision the first device based on the configuration information (308).

Example 1: A method includes obtaining, by one or more processors executing at a manager system, usage data from a plurality of devices, wherein each device of the plurality of devices is associated with one or more device types of a plurality of device types, and wherein each device type of the plurality of device types specifies a usage behavior; storing, by the one or more processors, common information based on the usage data, the common information specifying device configurations shared between each of the plurality of devices; for each device type of the plurality of device types: storing, by the one or more processor, device type features for a device type based on the usage data corresponding to one or more devices of the plurality of devices associated with the device type, the device type features specifying device configurations for the device type that is different than the common information; determining, by the one or more processors, a provisioning device type for a first device not included in the plurality of devices, the provisioning device type specifying at least one device type of the plurality of device types; determining, by the one or more processors, configuration information for provisioning the first device based on stored device type features associated with the provisioning device type and the common information; and provisioning, by the one or more processors, the first device based on the configuration information.

Example 2: The method of example 1, wherein determining the provisioning device type for the first device comprises: obtaining, by the one or more processors, a request to provision the first device, the request specifying the provisioning device type.

Example 3: The method of any of examples 1 and 2, wherein storing device type features for the device type comprises: providing a machine learning model the usage data and the common information; and outputting, by the machine learning model, the device type features.

Example 4: The method of any of examples 1 through 3, wherein determining configuration information for provisioning the first device comprises: combining device configurations specified by the common information with device configurations specified by device type features associated with the provisioning device type.

Example 5: The method of any of examples 1 through 4, wherein provisioning the first device comprises: generating, based on the configuration information for provisioning the first device, a schedule of a set of operations, wherein the schedule includes an allocation of computational resources associated with execution of the set of operations; and sending the schedule to the first device.

Example 6: The method of any of examples 1 through 5, wherein the usage data includes at least one of user interactions with the plurality of devices and operations executed by each of the plurality of devices.

Example 7: The method of any of examples 1 through 6, further includes obtaining first usage data from the first device; updating, based on the first usage data, the common information to specify device configurations shared between each of the plurality of devices and the first device; updating device type features associated with the provisioning device type based on the first usage data and updated common information; determining new configuration information for provisioning the first device based on the updated device type features associated with the provisioning device type; and provisioning the first device based on the new configuration information.

Example 8: The method of any of examples 1 through 7, further includes determining a new device type for a second device not included in the plurality of devices; obtaining second usage data from the second device; updating, based on the second usage data, the common information to specify device configurations shared between each of the plurality of devices, the first device, and the second device; and storing, based on the second usage data, device type features specifying device configurations for the new device type that is different than the updated common information.

Example 9: A manager device includes at least one processor; and a storage device that stores instructions executable by the at least one processor to: obtain usage data from a plurality of devices, wherein each device of the plurality of devices is associated with one or more device types of a plurality of device types, and wherein each device type of the plurality of device types specifies a usage behavior; store common information based on the usage data, the common information specifying device configurations shared between each of the plurality of devices; for each device type of the plurality of device types: storing device type features for a device type based on the usage data corresponding to one or more devices of the plurality of devices associated with the device type, the device type features specifying device configurations for the device type that is different than the common information; determine a provisioning device type for a first device not included in the plurality of devices, the provisioning device type specifying at least one device type of the plurality of device types; determine configuration information for provisioning the first device based on stored device type features associated with the provisioning device type and the common information; and provision the first device based on the configuration information.

Example 10: The manager device of example 9, wherein to determine the provisioning device type for the first device, the storage device stores instructions executable by the at least one processor to: obtain a request to provision the first device, the request specifying the provisioning device type.

Example 11: The manager device of any of examples 9 and 10, wherein to store device type features for the device type, the storage device stores instructions executable by the at least one processor to: provide a machine learning model the usage data and the common information; and output, by the machine learning model, the device type features.

Example 12: The manager device of any of examples 9 through 11, wherein to determine configuration information for provisioning the first device, the storage device stores instructions executable by the at least one processor to: combine device configurations specified by the common information with device configurations specified by device type features associated with the provisioning device type.

Example 13: The manager device of any of examples 9 through 12, wherein to provision the first device, the storage device stores instructions executable by the at least one processor to: generate, based on the configuration information for provisioning the first device, a schedule of a set of operations, wherein the schedule includes an allocation of computational resources associated with execution of the set of operations; and send the schedule to the first device.

Example 14: The manager device of any of examples 9 through 13, wherein the usage data includes at least one of user interactions with the plurality of devices and operations executed by each of the plurality of devices.

Example 15: The manager device of any of examples 9 through 14, wherein the storage device further stores instructions executable by the at least one processor to: obtain first usage data from the first device; update, based on the first usage data, the common information to specify device configurations shared between each of the plurality of devices and the first device; update device type features associated with the provisioning device type based on the first usage data and updated common information; determine new configuration information for provisioning the first device based on the updated device type features associated with the provisioning device type; and provision the first device based on the new configuration information.

Example 16: The manager device of any of examples 9 through 15, wherein the storage device further stores instructions executable by the at least one processor to: determine a new device type for a second device not included in the plurality of devices; obtain second usage data from the second device; update, based on the second usage data, the common information to specify device configurations shared between each of the plurality of devices, the first device, and the second device; and store, based on the second usage data, device type features specifying device configurations for the new device type that is different than the updated common information.

Example 17: Computer-readable storage medium encoded with instructions that, when executed, cause at least one processor of a computing system to: obtain usage data from a plurality of devices, wherein each device of the plurality of devices is associated with one or more device types of a plurality of device types, and wherein each device type of the plurality of device types specifies a usage behavior; store common information based on the usage data, the common information specifying device configurations shared between each of the plurality of devices; for each device type of the plurality of device types: store device type features for a device type based on the usage data corresponding to one or more devices of the plurality of devices associated with the device type, the device type features specifying device configurations for the device type that is different than the common information; determine a provision device type for a first device not included in the plurality of devices, the provision device type specifying at least one device type of the plurality of device types; determine configuration information for provision the first device based on stored device type features associated with the provision device type and the common information; and provision the first device based on the configuration information.

Example 18: The computer-readable storage medium of example 17, wherein to determine the provisioning device type for the first device, the instructions cause the at least one processor of the computing system to: obtain a request to provision the first device, the request specifying the provisioning device type.

Example 19: The computer-readable storage medium of any of examples 17 and 18, wherein to store device type features for the device type, the instructions cause the at least one processor of the computing system to: provide a machine learning model the usage data and the common information; and output, by the machine learning model, the device type features.

Example 20: The computer-readable storage medium of any of examples 17 through 19, wherein to determine configuration information for provisioning the first device, the instructions cause the at least one processor of the computing system to: combine device configurations specified by the common information with device configurations specified by device type features associated with the provisioning device type.

Example 21: The computer-readable storage medium of any of examples 17 through 20, wherein to provision the first device, the instructions cause the at least one processor of the computing system to: generate, based on the configuration information for provisioning the first device, a schedule of a set of operations, wherein the schedule includes an allocation of computational resources associated with execution of the set of operations; and send the schedule to the first device.

Example 22: The computer-readable storage medium of any of examples 17 through 21, wherein the usage data includes at least one of user interactions with the plurality of devices and operations executed by each of the plurality of devices.

Example 23: The computer-readable storage medium of any of examples 17 through 22, wherein the instructions further cause the at least one processor of the computing system to: obtain first usage data from the first device; update, based on the first usage data, the common information to specify device configurations shared between each of the plurality of devices and the first device; update device type features associated with the provisioning device type based on the first usage data and updated common information; determine new configuration information for provisioning the first device based on the updated device type features associated with the provisioning device type; and provision the first device based on the new configuration information.

Example 24: The computer-readable storage medium of any of examples 17 through 23, wherein the instructions further cause the at least one processor of the computing system to: determine a new device type for a second device not included in the plurality of devices; obtain second usage data from the second device; update, based on the second usage data, the common information to specify device configurations shared between each of the plurality of devices, the first device, and the second device; and store, based on the second usage data, device type features specifying device configurations for the new device type that is different than the updated common information.

Example 25: A computing system comprising means for performing any combination of examples 1-24.

Example 26: A computing device comprising means for performing any combination of examples 1-24.

Example 27: A non-transitory computer-readable storage medium encoded with instructions that, when executed by one or more processors, cause the one or more processors to perform any combination of examples 1-24.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples have been described. These and other examples are within the scope of the following claims.

What is claimed is:

1. A method comprising:
   obtaining, by one or more processors executing at a manager system, usage data from a plurality of devices, wherein each device of the plurality of devices is associated with one or more device types of a plurality of device types, and wherein each device type of the plurality of device types specifies a usage behavior;
   storing, by the one or more processors, common information based on the usage data, the common information specifying device configurations shared between each of the plurality of devices;
   for each device type of the plurality of device types:
      storing, by the one or more processor, device type features for a device type based on the usage data corresponding to one or more devices of the plurality of devices associated with the device type, the device type features specifying device configurations for the device type that is different than the common information;
   determining, by the one or more processors, a provisioning device type for a first device not included in the plurality of devices, the provisioning device type specifying at least one device type of the plurality of device types;
   determining, by the one or more processors, configuration information for provisioning the first device based on stored device type features associated with the provisioning device type and the common information; and
   provisioning, by the one or more processors, the first device based on the configuration information.

2. The method of claim 1, wherein determining the provisioning device type for the first device comprises: obtaining, by the one or more processors, a request to provision the first device, the request specifying the provisioning device type.

3. The method of claim 1, wherein storing device type features for the device type comprises:
   providing a machine learning model the usage data and the common information; and
   outputting, by the machine learning model, the device type features.

4. The method of claim 1, wherein determining configuration information for provisioning the first device comprises: combining device configurations specified by the common information with device configurations specified by device type features associated with the provisioning device type.

5. The method of claim 1, wherein provisioning the first device comprises:
   generating, based on the configuration information for provisioning the first device, a schedule of a set of operations, wherein the schedule includes an allocation of computational resources associated with execution of the set of operations; and
   sending the schedule to the first device.

6. The method of claim 1, wherein the usage data includes at least one of user interactions with the plurality of devices and operations executed by each of the plurality of devices.

7. The method of claim 1, further comprising:
   obtaining first usage data from the first device;
   updating, based on the first usage data, the common information to specify device configurations shared between each of the plurality of devices and the first device;
   updating device type features associated with the provisioning device type based on the first usage data and updated common information;
   determining new configuration information for provisioning the first device based on the updated device type features associated with the provisioning device type; and
   provisioning the first device based on the new configuration information.

8. The method of claim 1, further comprising:
   determining a new device type for a second device not included in the plurality of devices;
   obtaining second usage data from the second device;
   updating, based on the second usage data, the common information to specify device configurations shared between each of the plurality of devices, the first device, and the second device; and
   storing, based on the second usage data, device type features specifying device configurations for the new device type that is different than the updated common information.

9. A manager device comprising:
   at least one processor; and
   a storage device that stores instructions executable by the at least one processor to:
      obtain usage data from a plurality of devices, wherein each device of the plurality of devices is associated with one or more device types of a plurality of device types, and wherein each device type of the plurality of device types specifies a usage behavior;
      store common information based on the usage data, the common information specifying device configurations shared between each of the plurality of devices;
      for each device type of the plurality of device types:
         storing device type features for a device type based on the usage data corresponding to one or more devices of the plurality of devices associated with the device type, the device type features specifying device configurations for the device type that is different than the common information;

determine a provisioning device type for a first device not included in the plurality of devices, the provisioning device type specifying at least one device type of the plurality of device types;

determine configuration information for provisioning the first device based on stored device type features associated with the provisioning device type and the common information; and provision the first device based on the configuration information.

10. The manager device of claim 9, wherein, to store device type features for the device type, the storage device stores instructions executable by the at least one processor to:

provide a machine learning model the usage data and the common information; and output, by the machine learning model, the device type features.

11. The manager device of claim 9, wherein, to determine configuration information for provisioning the first device, the storage device stores instructions executable by the at least one processor to: combine device configurations specified by the common information with device configurations specified by device type features associated with the provisioning device type.

12. The manager device of claim 9, wherein, to provision the first device, the storage device stores instructions executable by the at least one processor to:

generate, based on the configuration information for provisioning the first device, a schedule of a set of operations, wherein the schedule includes an allocation of computational resources associated with execution of the set of operations; and send the schedule to the first device.

13. The manager device of claim 9, wherein the storage device further stores instructions executable by the at least one processor to:

obtain first usage data from the first device;

update, based on the first usage data, the common information to specify device configurations shared between each of the plurality of devices and the first device;

update device type features associated with the provisioning device type based on the first usage data and updated common information;

determine new configuration information for provisioning the first device based on the updated device type features associated with the provisioning device type; and provision the first device based on the new configuration information.

14. The manager device of claim 9, wherein the storage device further stores instructions executable by the at least one processor to:

determine a new device type for a second device not included in the plurality of devices;

obtain second usage data from the second device;

update, based on the second usage data, the common information to specify device configurations shared between each of the plurality of devices, the first device, and the second device; and store, based on the second usage data, device type features specifying device configurations for the new device type that is different than the updated common information.

15. A non-transitory computer-readable storage medium encoded with instructions that, when executed, cause at least one processor of a computing system to:

obtain usage data from a plurality of devices, wherein each device of the plurality of devices is associated with one or more device types of a plurality of device types, and wherein each device type of the plurality of device types specifies a usage behavior;

store common information based on the usage data, the common information specifying device configurations shared between each of the plurality of devices;

for each device type of the plurality of device types: store device type features for a device type based on the usage data corresponding to one or more devices of the plurality of devices associated with the device type, the device type features specifying device configurations for the device type that is different than the common information;

determine a provision device type for a first device not included in the plurality of devices, the provision device type specifying at least one device type of the plurality of device types;

determine configuration information for provision the first device based on stored device type features associated with the provision device type and the common information; and provision the first device based on the configuration information.

16. The non-transitory computer-readable storage medium of claim 15, wherein, to store device type features for the device type, the instructions cause the at least one processor of the computing system to:

provide a machine learning model the usage data and the common information; and output, by the machine learning model, the device type features.

17. The non-transitory computer-readable storage medium of claim 15, wherein, to provision the first device, the instructions cause the at least one processor of the computing system to:

generate, based on the configuration information for provisioning the first device, a schedule of a set of operations, wherein the schedule includes an allocation of computational resources associated with execution of the set of operations; and send the schedule to the first device.

18. The non-transitory computer-readable storage medium of claim 15, wherein the usage data includes at least one of user interactions with the plurality of devices and operations executed by each of the plurality of devices.

19. The non-transitory computer-readable storage medium of claim 15, wherein the instructions further cause the at least one processor of the computing system to:

obtain first usage data from the first device; update, based on the first usage data, the common information to specify device configurations shared between each of the plurality of devices and the first device;

update device type features associated with the provisioning device type based on the first usage data and updated common information;

determine new configuration information for provisioning the first device based on the updated device type features associated with the provisioning device type; and provision the first device based on the new configuration information.

20. The non-transitory computer-readable storage medium of claim 15, wherein the instructions further cause the at least one processor of the computing system to:

determine a new device type for a second device not included in the plurality of devices; obtain second usage data from the second device;

update, based on the second usage data, the common information to specify device configurations shared between each of the plurality of devices, the first device, and the second device; and store, based on the second usage data, device type features specifying device configurations for the new device type that is different than the updated common information.

* * * * *